(12) United States Patent
Upston et al.

(10) Patent No.: US 9,603,488 B2
(45) Date of Patent: Mar. 28, 2017

(54) BLADE AND BEARING ASSEMBLY FOR A BLENDER JUG

(71) Applicant: Breville Pty Limited, Botany, NSW (AU)

(72) Inventors: Greg Upston, Ridgewood (AU); Brendan John Foxlee, Earlwood (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 437 days.

(21) Appl. No.: 14/349,660

(22) PCT Filed: Sep. 26, 2012

(86) PCT No.: PCT/AU2012/001157
§ 371 (c)(1),
(2) Date: Apr. 4, 2014

(87) PCT Pub. No.: WO2013/049881
PCT Pub. Date: Apr. 11, 2013

(65) Prior Publication Data
US 2014/0239107 A1    Aug. 28, 2014

(30) Foreign Application Priority Data

Oct. 5, 2011 (AU) ................................ 2011904094
Oct. 14, 2011 (AU) ................................ 2011904255

(51) Int. Cl.
*A47J 43/046*    (2006.01)
*A47J 43/07*    (2006.01)

(52) U.S. Cl.
CPC ......... *A47J 43/046* (2013.01); *A47J 43/0716* (2013.01); *A47J 43/0722* (2013.01)

(58) Field of Classification Search
CPC ...... A47J 43/046; A47J 43/07; A47J 43/0716; A47J 43/0722
USPC ..................................... 366/205–206; 99/348
See application file for complete search history.

(56) References Cited

U.S. PATENT DOCUMENTS

| | | | | |
|---|---|---|---|---|
| 2,750,162 | A * | 6/1956 | Kircher | A47J 43/07 220/632 |
| 3,713,628 | A * | 1/1973 | Christensen | A47J 43/046 241/199.9 |
| 3,785,579 | A * | 1/1974 | Voglesonger | A47J 43/0766 241/282.1 |
| 4,828,396 | A * | 5/1989 | Singer | B01F 15/00824 366/149 |
| 4,887,910 | A * | 12/1989 | Bravo | A23G 9/224 366/205 |

(Continued)

FOREIGN PATENT DOCUMENTS

CN    201948848       8/2011
FR    2967340 A1 *   5/2012  .......... A47J 43/0716

(Continued)

*Primary Examiner* — Charles Cooley
(74) *Attorney, Agent, or Firm* — Michael Molins

(57) ABSTRACT

A blade and bearing assembly for a jug having a lower aperture defined by a throat. The assembly comprising: a head element and a base element; a shaft being rotatable mounted within the assembly, the shaft passing though the head element for receiving a blade element; wherein, in use, the head element and the base element are brought into clamping engagement with respect to the jug for retaining the assembly in the throat of the jug.

14 Claims, 3 Drawing Sheets

(56) References Cited

U.S. PATENT DOCUMENTS

| | | | |
|---|---|---|---|
| 6,709,150 B2* | 3/2004 | Lin | A47J 43/0716 241/199.12 |
| 6,960,015 B2* | 11/2005 | Lee | A47J 43/0722 366/205 |
| 8,550,695 B2* | 10/2013 | Conti | A47J 43/0727 366/205 |
| 9,370,280 B2* | 6/2016 | Conti | A47J 43/0727 |
| 2003/0214877 A1* | 11/2003 | Lin | A47J 43/0716 366/214 |
| 2005/0099884 A1* | 5/2005 | Lee | A47J 43/0722 366/205 |
| 2006/0123996 A1* | 6/2006 | Pavlovic | A47J 43/07 99/348 |
| 2008/0198688 A1* | 8/2008 | Peng | A47J 27/004 366/145 |
| 2009/0114616 A1* | 5/2009 | White | A47J 43/0722 215/307 |
| 2013/0077433 A1* | 3/2013 | Conti | A47J 43/0727 366/205 |
| 2014/0239107 A1* | 8/2014 | Upston | A47J 43/046 241/282.2 |
| 2015/0023130 A1* | 1/2015 | Foxlee | A47J 43/0722 366/205 |
| 2015/0230663 A1* | 8/2015 | Wade | A47J 43/0722 241/199.12 |
| 2015/0305565 A1* | 10/2015 | Barfus, Jr. | A47J 43/0465 366/205 |

FOREIGN PATENT DOCUMENTS

| | | | |
|---|---|---|---|
| GB | 681064 A | * 10/1952 | A47J 43/046 |
| WO | WO2012066229 | 5/2012 | |

\* cited by examiner

BLADE AND BEARING ASSEMBLY FOR A BLENDER JUG

FIELD OF THE INVENTION

The invention relates to food and beverage blenders and more particularly to the blade and bearing assembly of a removable blender jug.

The invention has been developed primarily as a blade and bearing assembly of a removable blender jug and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Food and beverage blenders are commonly used in homes and commercial establishments. Typically, a blender comprises a base within which is a motor. An external female coupling of the motor cooperates with a male coupling located on an underside of the blender jug. When the jug is properly seated on the blender, the couplings cooperate so that the motor can turn the blades that are located within the jug. The blades are associated with a shaft that extends between the jug's male coupling and the blades. The shaft must be supported for rapid and reliable rotating motion by bearings or bushings.

OBJECTS OF THE INVENTION

It is an object of the present invention to overcome or ameliorate at least one of the disadvantages of the prior art, or to provide a useful alternative.

It is an object of the invention in a preferred form to provide a blade and bearing assembly that can be assembled with a cooperating jug. In preferred embodiments, the bearing and blade assembly is not removable by a normal domestic user.

SUMMARY OF THE INVENTION

According to an aspect of the invention there is provided a blade and bearing assembly for a jug having a lower aperture defined by a throat, the assembly comprising:
   a head element and a base element;
   a shaft being rotatable mounted within the assembly, the shaft passing though the head element for receiving a blade element;
   wherein, in use, the head element and the base element are brought into clamping engagement with respect to the jug for retaining the assembly in the throat of the jug.

Preferably, releasing the base element from clamping engagement with respect to the jug, thereby enabling the assembly to be removed from the jug.

Preferably, one or more fasteners couple the head element and the base element together; wherein, in use, tightening the fasteners brings the head element and the base element into clamping engagement with respect to the jug.

Preferably, the assembly further includes a bearing set supported within the assembly; wherein the bearing set rotatably supporting the shaft. More preferably, the bearing set is supported within the assembly by an upper bearing seat and a lower bearing seat. Most preferably, the bearing set is retained with respect to the shaft by a bearing fastener element. Releasing the base element from clamping engagement with respect to the jug, preferably enables access to the bearing set and bearing seats.

Preferably, the shaft passes though the base element for receiving a coupling component.

Preferably, the head element has an upper surface portion for improving sealing engagement with an upper seal. More preferably, the upper surface portion is in the form of a metallic plate. Most preferably, the upper seal is secured between the blade element and the upper surface portion.

Preferably, the base element is a rigid base element.

Preferably, the head element is a blade holder head element.

BRIEF DESCRIPTION OF THE DRAWING FIGURES

In order that the invention be better understood, reference is now made to the following drawing figures in which.

BEST MODE AND OTHER EMBODIMENTS

Figure 1:
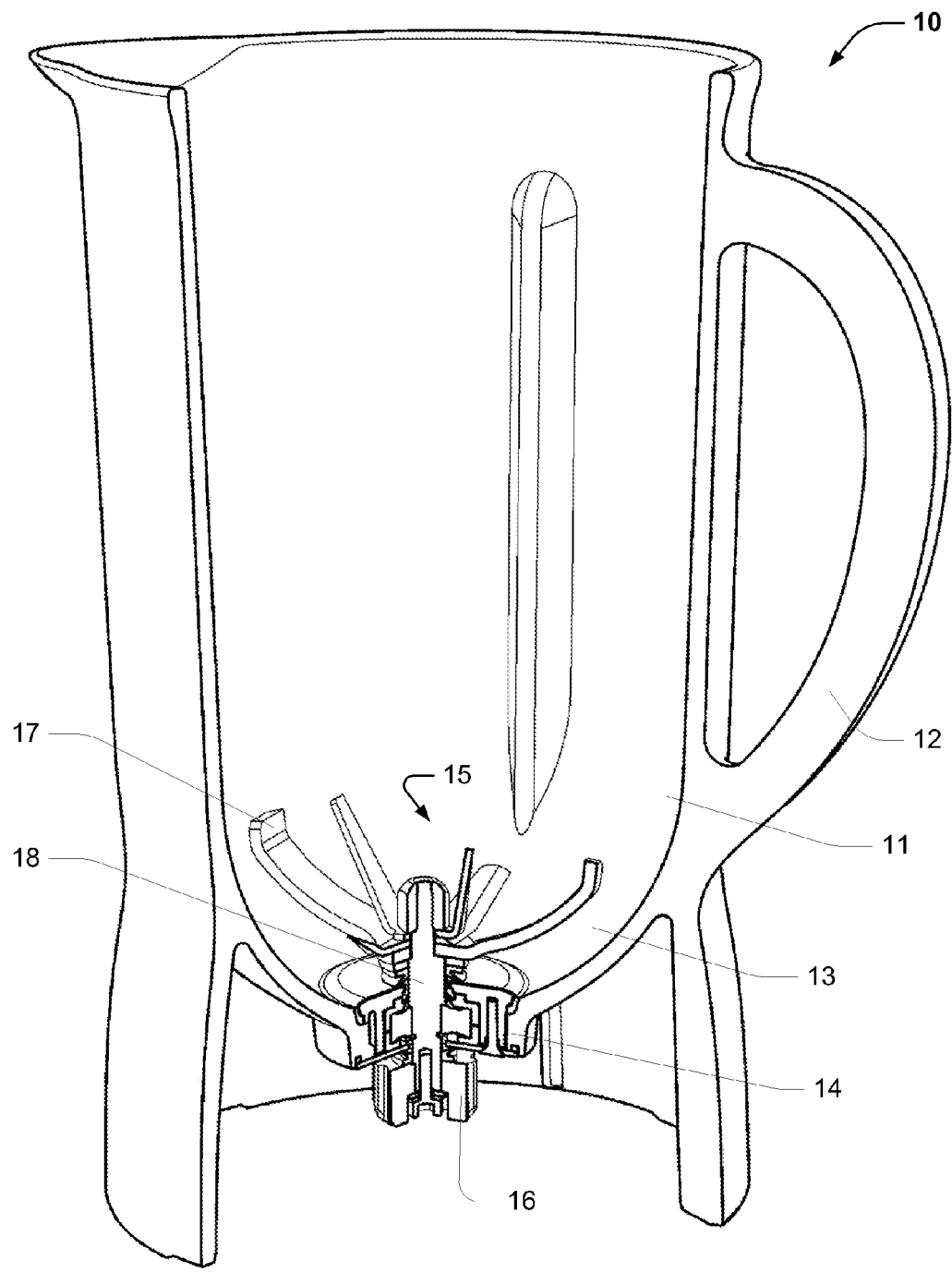
FIG. 1 is a side elevation, partially sectioned to reveal a blade and bearing assembly.

As shown in FIG. 1, a removable blender jug 10 comprises a glass or polymeric vessel 11 with an optional handle 12. In this example, the lower extent of the vessel 13 is bowl shaped. It may however have any practical shape. The lowermost portion of the vessel comprises an opening defined by a throat 14. A blade and bearing assembly 15 extends through the throat 14. The blade and bearing assembly 15 further comprises a male coupling component 16 that extends below the blade and is adapted to cooperate with a rotating female coupling that is driven by the blender's motor. Rotation of the coupling 16 is transmitted to the blades 17 by a central shaft 18.

Figure 2:
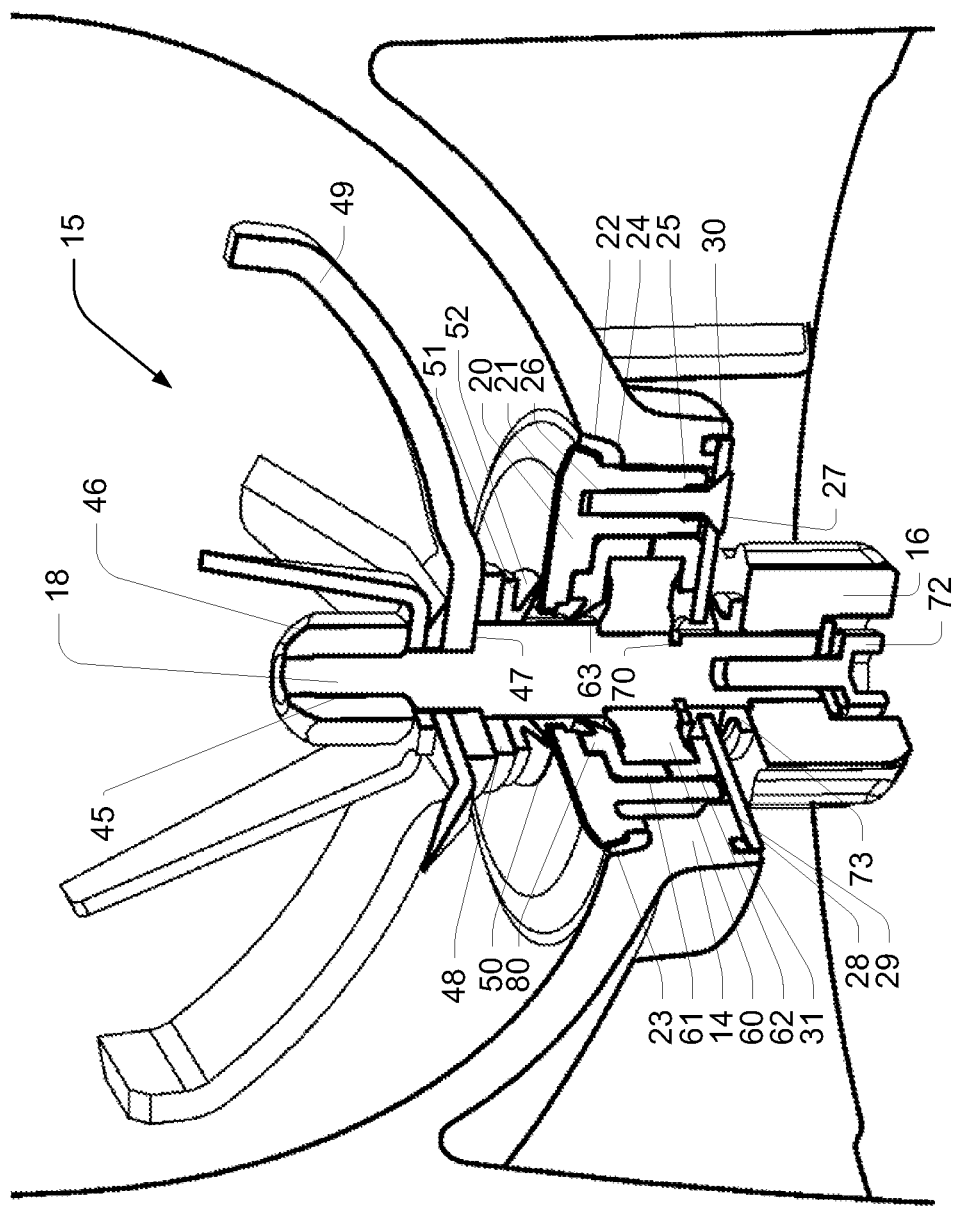
FIG. 2 is a close up view of the blade and bearing assembly depicted in FIG. 1.

As shown in FIG. 2, the blade and bearing assembly 15, further comprises a blade holder 20. The blade holder 20 has an upper and slightly enlarged head 21 that abuts against a circumferential seal 22. The seal 22 prevents fluid from escaping into the area between the outer edge of the head 23 and the circumferential shoulder 24 that surrounds the upper extent of the throat. The blade holder 20 also has a hub portion 25 that extends below the head 21. The hub or body portion 25 has openings 26 for receiving fasteners 27 that extend into the hub from below. The fasteners, for example, pan head fasteners 27 extend through a metal or rigid bearing plate 28. The bearing plate 28 abuts against a lower surface 29 of the throat 14. To better locate and stabilise the bearing plate 28, the lower surface of the throat is provided with a circumferential rib 30, within which the bearing plate 28 is seated. An O-ring or seal 31 is located close to the rib 30 and between the bearing plate 28 and the throat 14. Accordingly, the fasteners 27, when tightened, clamp the blade holder into the area of the throat 14 and prevent it from being withdrawn unless the fasteners 27 and bearing plate 28 are removed. Under normal circumstances, this will be done by a technician or a repair person and not by the end user. In preferred embodiments, the head 21 is covered and protected by a blade holder plate fabricated from sheet metal.

Figure 3:
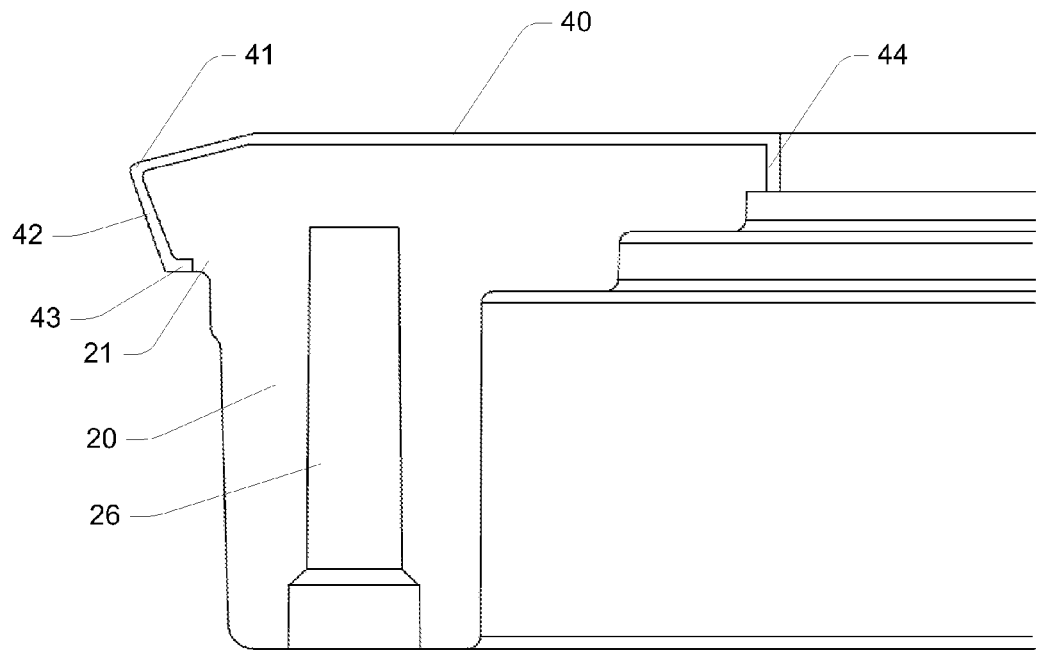
FIG. 3 is a cross section view of a blade holder.

As shown in FIG. 3, the blade holder plate 40 covers the entirety of the upper surface of the blade holder. Further, the blade holder plate comprises a vertical wall or bore 42 through which protrudes the shaft 18. The blade holder plate 40 also wraps around the upper edge 41 of the head 21, also covering the outer peripheral edge 42 of the head. In preferred embodiments, the blade holder plate 40 also comprises an inwardly directed or horizontal rim 43 that is essentially embedded in a circumferential slot in the head by the process of over moulding. That is, the metallic blade holder plate is inserted into the mould in which the blade holder is formed. The moulding process permanently bonds the blade holder plate 40 to the blade holder 20. The integration of these parts reduces noise and vibration, is simpler and more hygienic than some assemblies, having few gaps in which to trap food.

Figure 4:
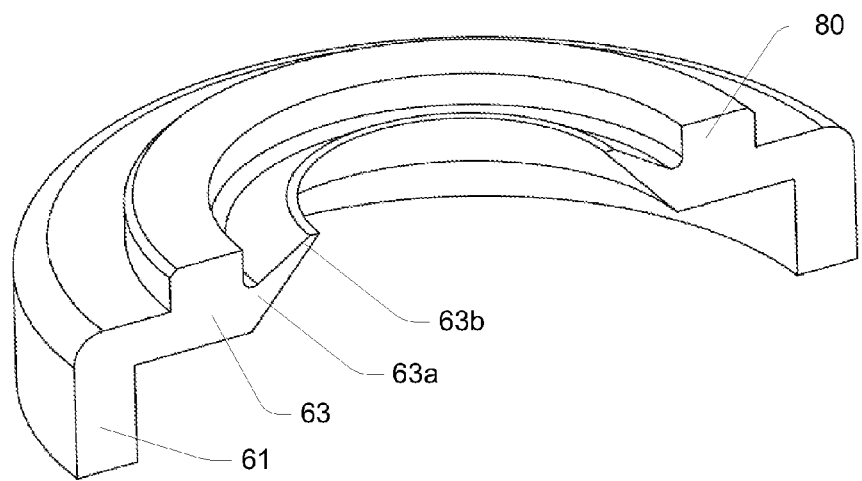
FIG. 4 is a perspective view, cross sectioned, of a seal.

With reference to FIG. 2 and FIG. 4, it can be seen that the central shaft 18 comprises an upper threaded portion 45 that cooperates with a blade nut 46 clamps the blades against a circumferential shoulder 47 formed on the shaft 18.

A toroidal or other spacer 48 is interposed between the lowermost blade 49 and the upper V-seal 50. The upper V-seal 50 comprises a horizontal flange with a central opening 51 and a tapered wiper portion 52. The tip of the wiper portion 52 seals against the metallic blade holder plate 40. The shaft 18 is supported for rotation by a bearing set 60. The bearing set 60 is supported within the blade holder hub by an upper bearing seat 61 and a lower bearing seat 62. In cross section, the lower bearing seat 62 is essentially "L" shaped. The upper bearing seat 61 is also essentially "L" shaped but also includes an integral "Y" seal 63. The integral "Y" seal 63 has a tapered wiper portion that impinges on the outer surface of the shaft 18 and further prevents liquids from contacting the bearing set 60. Combining the upper bearing seat with the "Y" seal 63 reduces cost, is compact and simplifies assembly. The bearing set 60 is retained by a circlip (or other fastener) that is retained in a circumferential groove in the shaft 18. The male coupling component 16 is retained on a lower extent of the shaft by a threaded fastener 72. In preferred embodiments, a "V" seal 73 is interposed between an upper surface of the male coupling 16 and the bearing plate 28.

As shown in FIG. 4, the upper bearing seat 61 includes an integral "Y" seal 63 having a tapering seal rim 63a whose inner tip 64b makes sealing contact with an outer surface of a shaft 18. The upper bearing seat 61 also comprises a vertically extending lip 80 that engages with a recess formed in the underside of the head 21 of the blade holder 20. The integration of the seal and the bearing seat has manufacturing advantages relating to cost and reworking of problematic assemblies.

In an embodiment, it will be appreciated that, the blade and bearing assembly is located within the opening defined by a throat 14 of a jug 10, and the jug is clamped between a head element 21 and a base element 28. By way of example only, fasteners 27, when tightened, clamp the assembly into the area of the throat 14. The assembly, includes a bearing set 60 located between the head element 21 and the base element 28 for supporting rotation of the shaft 18. The shaft being received though the head element and the base element. The head element 21 can, by way of example, include an upper surface portion for improving sealing engagement with an upper "V" seal 50. The upper surface portion is typically in the form of a metallic plate 40. A bearing set 60 is supported within the blade holder hub by an upper bearing seat 61 and a lower bearing seat 62. The bearing set 60 is retained with respect to the shaft by a bearing fastener.

It will be further appreciated that, by removing the base element: the blade and bearing assembly can be removed; and/or access can be made to the bearing set and/or bearing seats.

It will be appreciated that a disclosed embodiment provides a useful alternative blade and bearing assembly. It will be further appreciated that a disclosed embodiment provides a blade and bearing assembly that can be assembled with a cooperating jug.

While the present invention has been disclosed with reference to particular conventional details of construction, these should be understood as having been provided by way of example and not as limitations to the scope of the invention.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The claims defining the invention are as follows:

1. A blade and bearing assembly for a jug having a lower aperture defined by a throat, the assembly comprising:
   a head element and a base element; the head element and the base element being in an opposing configuration about the throat of the jug, the head element having a body portion received within the lower aperture;
   a shaft being rotatable mounted within the assembly, the shaft passing though the head element for receiving a blade element; and
   a plurality of separate removable fasteners, each of the fasteners extend through the base element from below and are received by a respective opening in the body portion for coupling and aligning the head element to the base element, wherein the fasteners are tightened to bring the head element and the base element into clamping engagement with the throat of the jug clamped there-between and the body portion retained within the lower aperture.

2. The assembly according to claim 1, wherein releasing the base element from clamping engagement with respect to the jug, thereby enabling the assembly to be removed from the jug.

3. The assembly according to claim 1, further including a bearing set supported therein; wherein the bearing set rotatably supporting the shaft.

4. The assembly according to claim 3, wherein bearing set is supported within the assembly by an upper bearing seat and a lower bearing seat.

5. The assembly according to claim 3, wherein the bearing set is retained with respect to the shaft by a bearing fastener element.

6. The assembly according to claim 3, wherein releasing the base element from clamping engagement with respect to the jug, enables access to the bearing set and a respective pair of bearing seats.

7. The assembly according to claim 1, wherein the shaft passes though the base element for receiving a coupling component.

8. The assembly according to claim 1, wherein the head element has an upper surface portion for improving sealing engagement with an upper seal.

9. The assembly according to claim 8, wherein the upper surface portion is in the form of a metallic plate.

10. The assembly according to claim 8, wherein the upper seal is secured between the blade element and the upper surface portion.

11. The assembly according to claim 1, wherein the base element is a rigid base element.

12. The assembly according to claim 11, wherein the head element has an upper surface portion for improving sealing engagement with an upper seal.

13. The assembly according to claim 1, wherein the head element is a blade holder head element.

14. The assembly according to claim 13, wherein the head element has an upper surface portion for improving sealing engagement with an upper seal.

* * * * *